(12) United States Patent
Feng et al.

(10) Patent No.: US 10,309,616 B2
(45) Date of Patent: Jun. 4, 2019

(54) DISPLAY PANEL FOR RELEASING STATIC ELECTRICITY AND DISPLAY DEVICE

(71) Applicants: BOE Technology Group Co., Ltd., Beijing (CN); Beijing BOE Optoelectronics Technology Co., Ltd., Beijing (CN)

(72) Inventors: Xuqing Feng, Beijing (CN); Tingting Zhao, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 83 days.

(21) Appl. No.: 15/526,127

(22) PCT Filed: Sep. 29, 2016

(86) PCT No.: PCT/CN2016/100706
§ 371 (c)(1),
(2) Date: May 11, 2017

(87) PCT Pub. No.: WO2017/118119
PCT Pub. Date: Jul. 13, 2017

(65) Prior Publication Data
US 2018/0080628 A1    Mar. 22, 2018

(30) Foreign Application Priority Data
Jan. 6, 2016  (CN) .......................... 2016 1 0007257

(51) Int. Cl.
*G06F 3/041*  (2006.01)
*F21V 9/14*   (2006.01)
(Continued)

(52) U.S. Cl.
CPC ................ *F21V 9/14* (2013.01); *G06F 3/044* (2013.01); *G06F 3/047* (2013.01); *G06F 3/0412* (2013.01);
(Continued)

(58) Field of Classification Search
CPC ........ G06F 3/0412; G06F 3/044; G06F 3/047; G06F 2203/04107; F21V 9/14; H05F 3/02
See application file for complete search history.

(56) References Cited

U.S. PATENT DOCUMENTS

2013/0329171 A1* 12/2013 Xu .................... G02F 1/134363
349/106

FOREIGN PATENT DOCUMENTS

CN  103969884 A  8/2014
CN  104536184 A  4/2015
(Continued)

OTHER PUBLICATIONS

Dec. 21, 2016—(WO) International Search Report and Written Opinion Appn PCT/CN2016/100706 with English Tran.
(Continued)

*Primary Examiner* — Lisa S Landis
(74) *Attorney, Agent, or Firm* — Banner & Witcoff, Ltd.

(57) ABSTRACT

A display panel and a display device are provided, and the display panel includes: an array substrate; an opposing substrate, disposed above the array substrate; an upper polarizer, disposed above the opposing substrate; an adhesive layer, disposed above the upper polarizer and in which a conductive material is distributed; a protection substrate, disposed above the adhesive layer and fixed with the upper polarizer by the adhesive layer; and an electrostatic release structure, contacting with the adhesive layer and configured to release static electricity of the adhesive layer. The adhe-
(Continued)

sive layer provided in embodiments of the present disclosure transmits static electricity produced in the display panel to the electrostatic release structure to release the static electricity from the display panel.

15 Claims, 5 Drawing Sheets

(51) Int. Cl.
*G06F 3/047* (2006.01)
*H05F 3/02* (2006.01)
*G06F 3/044* (2006.01)

(52) U.S. Cl.
CPC ........... *H05F 3/02* (2013.01); *G02F 2202/22* (2013.01); *G06F 2203/04107* (2013.01)

(56) References Cited

FOREIGN PATENT DOCUMENTS

| CN | 104765093 | * | 7/2015 |
|---|---|---|---|
| CN | 104765093 A | | 7/2015 |
| CN | 204667010 U | | 9/2015 |
| CN | 105467646 A | | 4/2016 |
| JP | 2015011179 | * | 1/2015 |
| JP | 2015011179 A | | 1/2015 |

OTHER PUBLICATIONS

Aug. 3, 2016—(CN) First Office Action Appn 201610007257.9 with English Tran.

* cited by examiner

DISPLAY PANEL FOR RELEASING STATIC ELECTRICITY AND DISPLAY DEVICE

The application is a U.S. National Phase Entry of International Application No. PCT/CN2016/100706 filed on Sep. 29, 2016, designating the United States of America and claiming priority to Chinese Patent Application No. 201610007257.9, filed Jan. 6, 2016. The present application claims priority to and the benefit of the above-identified applications and the above-identified applications are incorporated by reference herein in their entirety.

TECHNICAL FIELD

Embodiments of the present disclosure relate to a display panel and a display device.

BACKGROUND

An electrostatic voltage is generated by mutual contact and separation of substances, and a generated voltage is determined by characteristics of materials in contact with each other (such as frictional contact). For example, static electricity in a touch display apparatus is mainly produced by direct contact or indirect contact between a human body and a related component in a process of production and use.

In a case that the static electricity in the touch display apparatus is larger, the static electricity may burn out a driving integrated circuit in a display module or lead to a disconnection of circuits in a peripheral area of the touch display apparatus, thus an abnormal display is occurred, such as more red or more blue in an image, or even unable to output image etc.

SUMMARY

Embodiments of the present disclosure provide a display panel and a display device, in the embodiments of the present disclosure, static electricity in the display panel released by a simple structure may be achieved.

At least one embodiment of the present disclosure provides a display panel, and the display panel comprises: an array substrate; an opposing substrate, disposed above the array substrate; an upper polarizer, disposed above the opposing substrate; an adhesive layer, disposed above the upper polarizer and in which a conductive material is distributed; a protection substrate, disposed above the adhesive layer and fixed with the upper polarizer by the adhesive layer; and an electrostatic release structure, contacting with the adhesive layer and configured to release static electricity of the adhesive layer.

At least one embodiment of the present disclosure further provides a display panel, and the display panel comprises: an array substrate; an opposing substrate, disposed above the array substrate; an adhesive layer, disposed above the opposing substrate and in which a conductive material is distributed; a protection substrate, disposed above the adhesive layer and fixed with the opposing substrate by the adhesive layer; and an electrostatic release structure, contacting with the adhesive layer and configured to release static electricity of the adhesive layer.

At least one embodiment of the present disclosure further provides a display device, which comprises any one of the display panels as mentioned above.

BRIEF DESCRIPTION OF THE DRAWINGS

In order to clearly illustrate the technical solution of the embodiments of the present disclosure, the drawings of the embodiments will be briefly described in the following, it is obvious that the described drawings are only related to some embodiments of the present disclosure, and thus are not limitative of the present disclosure.

Figure 1:
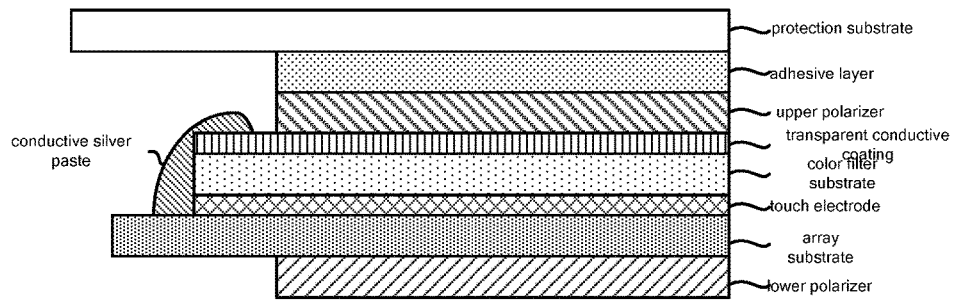
FIG. 1 to FIG. 4 are schematic diagrams of structures of known display panels for inventors.

Reference numerals:

1—array substrate; 2—opposing substrate; 3—upper polarizer; 4—adhesive layer; 5—protection substrate; 6—electrostatic release structure; 7—touch electrode layer; 8—lower polarizer; 9—ground wiring; 10—effective light emitting region; 11—first extending section; 12—insulating layer; 13—shell; 21—second extending section; 31—third extending section.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Over," "under," "right," "left" and the like are only used to indicate relative position relationship, and when the position of the object which is described is changed, the relative position relationship may be changed accordingly.

It should be noted that, in the case of having no conflict, embodiments of the present application and features of the embodiments can be combined with each other.

For example, as illustrated in FIG. 1 to FIG. 4, a touch display apparatus comprises a lower polarizer, an array substrate, a color filter substrate, an upper polarizer, an adhesive layer, a protective layer and a touch electrode.

Figure 2:
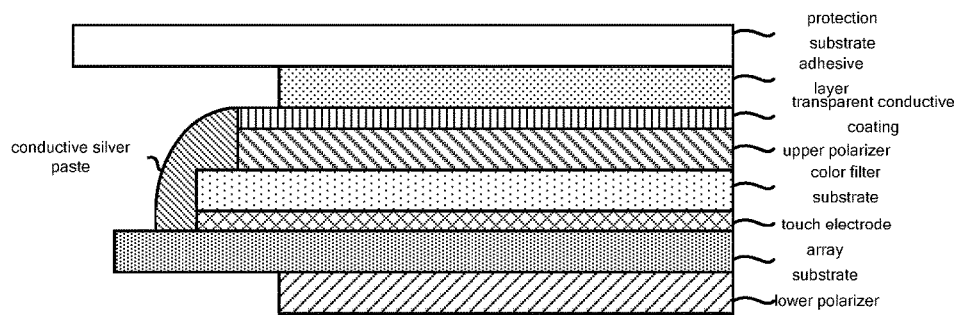
Figure 3:
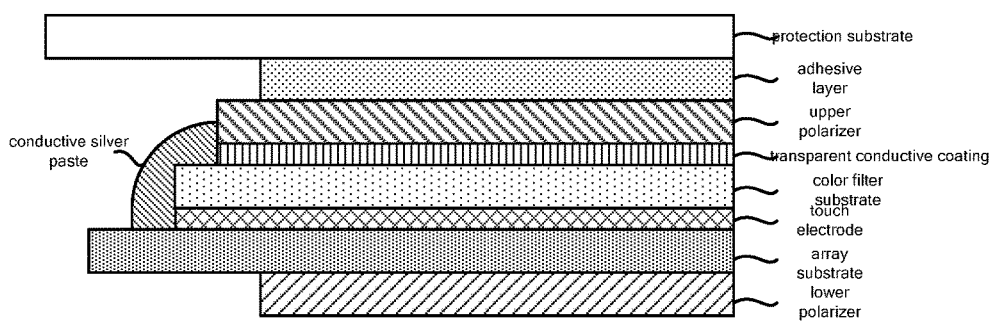

For example, for the touch display apparatus in which the touch electrode is disposed between the array substrate and the color filter substrate, the main method to prevent static electricity is: disposing an antistatic transparent conductive coating on the color filter substrate, and then releasing the static electricity by connecting conductive silver paste with the transparent conductive coating, as illustrated in FIG. 1. However, a resistance value of the transparent conductive coating is usually less than 1000 Ω, the transparent conductive coating may shield a touch signal, which is easy to cause a lack of touch signal value, and further cause a bad touch. Another method to prevent static electricity is to form a transparent conductive coating on an upper surface (as illustrated in FIG. 2) or a lower surface (as illustrated in FIG. 3) of the upper polarizer, and then after the upper polarizer is disposed on the color filer substrate, conductive silver paste is coated on an edge of the upper polarizer so as to release the static electricity. However, the method needs to coat long strip silver paste on an edge of the upper polarizer, which increases cost and difficulty of coating the silver paste. At the same time, because the transparent conductive coating disposed on the upper polarizer and the silver paste are end connection, the connection area between the transparent conductive coating and the silver paste is small and the contact reliability is poor, and a process of coating the long strip silver paste is difficult, which affects the yield of the full lamination process.

Figure 4:
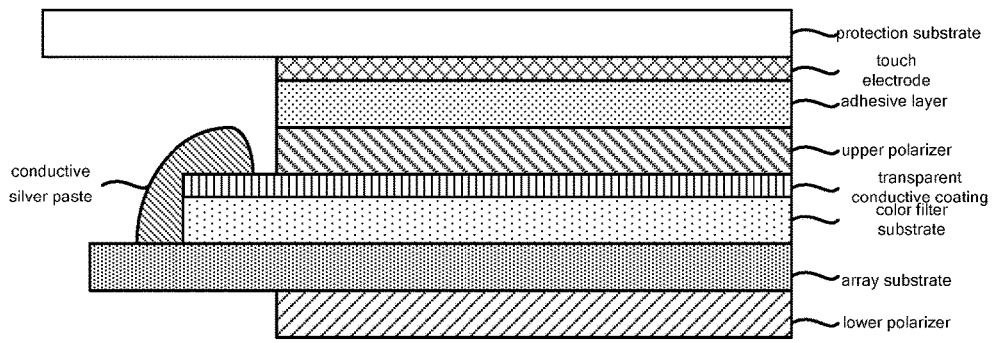

For example, as illustrated in FIG. 4, for the touch display apparatus in which the touch electrode is disposed between the protective layer and the color filter substrate, the main method to prevent static electricity is: disposing an antistatic transparent conductive coating on the color filter substrate, however, the method also requires an additional process for setting a transparent conductive coating, thus the complexity of the process is increased.

Figure 5:
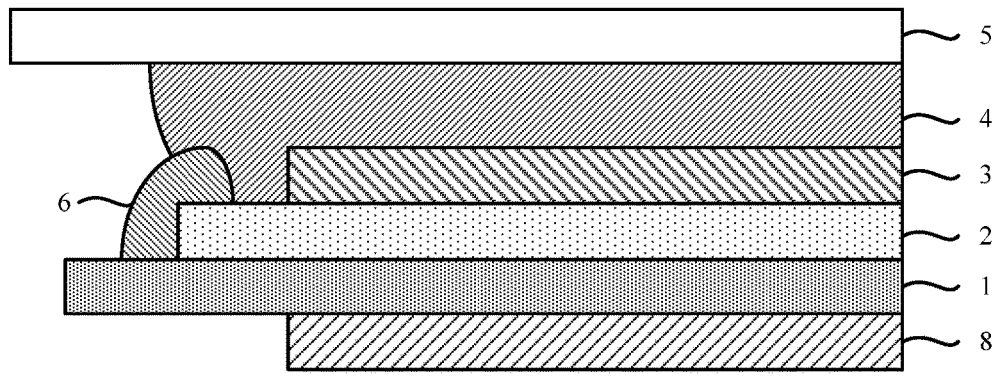
FIG. 5 is a schematic diagram of a structure of a display panel provided by an embodiment of the present disclosure.

As illustrated in FIG. 5, a display panel provided by one embodiment of the present disclosure comprises: an array substrate 1; an opposing substrate 2 which is disposed above the array substrate 2, for example, the opposing substrate in the embodiment of the present disclosure is a color filter substrate; an upper polarizer 3 which is disposed above the opposing substrate 2; an adhesive layer 4 which is disposed above the upper polarizer 3 and in which a conductive material is distributed; a protective layer 5 which disposed above the adhesive layer 4 and fixed with the upper polarizer 3 by the adhesive layer 4; and an electrostatic release structure 6 contacting with the adhesive layer 4 and configured to release static electricity of the adhesive layer 4. For example, a lower polarizer 8 is disposed under the array substrate 1.

In at least one embodiment of the present disclosure, the conductive material distributed in the adhesive layer which is configured to adhesive the protection substrate and the upper polarizer makes the adhesive layer has a certain conductive function, thus, the static electricity generated in the display panel is transmitted to the electrostatic release structure by the adhesive layer, and the static electricity is released from the display panel by the electrostatic release structure. The adhesive layer in the embodiments of the present disclosure can be realized only by adjusting the conductive property of the adhesive layer in the display panel illustrated in FIG. 1 to FIG. 4, and it is not necessary to add an extra layer in the display panel, therefore the structure is simple and easy to be realized.

For example, the display device provided by at least one embodiment of the present disclosure further comprises a touch electrode layer 7. For example, the touch electrode layer 7 is disposed between the array substrate 1 and the opposing substrate 2 (as illustrated in FIG. 6, the embodiment is applicable to an in cell structure).

Figure 7:
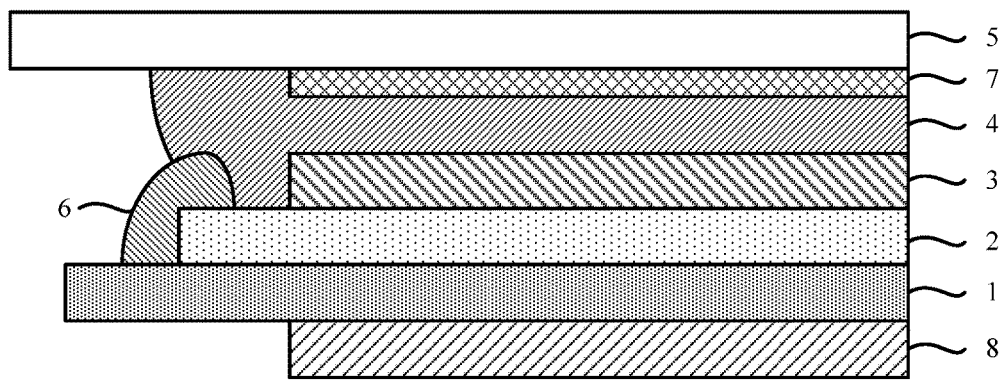
FIG. 7 is another schematic diagram of a structure of a display panel provided by an embodiment of the present disclosure.

For example, the touch electrode layer 7 is disposed between the opposing substrate 2 and the protection substrate 5 (as illustrated in FIG. 7). For example, the touch electrode layer 7 is disposed between the opposing substrate 2 and the upper polarizer 3, the embodiment is applicable to an on cell structure. For example, the touch electrode layer 7 may also be disposed between the upper polarizer 3 and the protection substrate 5. For example, the touch electrode layer 7 is disposed between the adhesive layer 4 and the protection substrate 5 (as illustrated in FIG. 7). For example, the touch electrode layer 7 is located above a substrate (such as a glass substrate) on the upper polarizer 3 and located between the substrate and the protection substrate 5.

Figure 6:
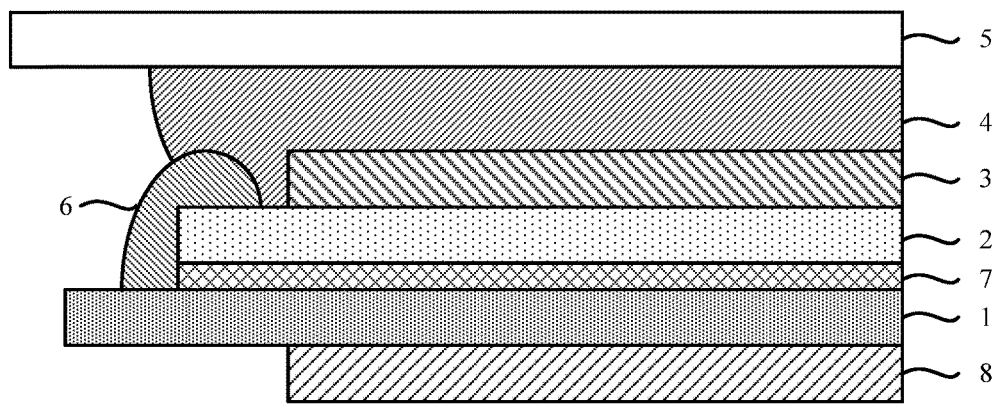
FIG. 6 is another schematic diagram of a structure of a display panel provided by an embodiment of the present disclosure.

As illustrated in FIG. 6, for example, the touch electrode layer 7 is disposed below the adhesive layer 4 (that is the touch electrode layer is disposed on one side of the adhesive layer away from the protection substrate). For example, the touch electrode layer 7 is disposed between the array substrate 1 and the opposing substrate 2, a resistance of the adhesive layer 4 is greater than or equal to $10^7$ Ω and is less than or equal to $10^{12}$ Ω.

In a structure that the touch electrode layer is disposed below the adhesive layer (for example, the touch electrode is disposed between the array substrate and the opposing substrate), the resistance of the adhesive layer may be larger, but not too large, so as to have a certain electrical conductivity. On one hand, if a user touches the protection substrate to form a touch signal in the touch electrode layer, the adhesive layer may not shield the touch signal, so as to ensure that the touch electrode layer produces an accurate touch signal according to the user's touch operation. On the other hand, it ensures that the adhesive layer is capable of transmitting the static electricity to the electrostatic release structure.

For example, an adhesive material in the adhesive layer comprises an optical clear resin (OCR). A resistance of the optical clear resin without adding a conductive material is generally greater than $10^{14}$ Ω. In the embodiment of the present disclosure, for example, a small amount of conductive materials such as conducting particles or conducting groups may be added into the optical clear resin, so that the optical clear resin may have a certain conductivity, but the resistance of the optical clear resin is still larger, for example, the resistance of the optical clear resin is from $10^7$ Ω to $10^{12}$ Ω.

As illustrated in FIG. 7, for example, the touch electrode layer 7 is disposed between the opposing substrate 2 and the protection substrate 5. For example, the touch electrode layer 7 is disposed above the adhesive layer 4 (that is the touch electrode layer 7 is disposed on one side of the adhesive layer 4 facing the protection substrate 5). For example, the touch electrode layer 7 is disposed on a lower surface of the protective layer 5, the resistance of the adhesive layer is less than or equal to $10^4$ Ω.

In a structure that the touch electrode layer is disposed between the opposing substrate and the protective layer, for example, in a structure that the touch electrode is disposed above the adhesive layer (for example, the touch electrode is disposed on a lower surface of the protective layer), the resistance of the adhesive layer is set smaller to reduce the influence of an electrical signal in the array substrate on the touch signal in the touch electrode layer, so as to ensure that the touch electrode layer produces an accurate touch signal according to the user's touch operation.

For example, an adhesive material in the adhesive layer comprises an optical clear resin (OCR). A resistance of the optical clear resin without adding a conductive material is generally greater than $10^{14}$ Ω. In at least one embodiment of the present disclosure, for example, a larger amount of conductive materials such as conducting particles or conducting groups may be added into the optical clear resin, so that the optical clear resin has a strong electrically conductive, and has a small resistance, for example, the resistance of the optical clear resin is less than or equal to $10^4$ Ω.

Figure 8:
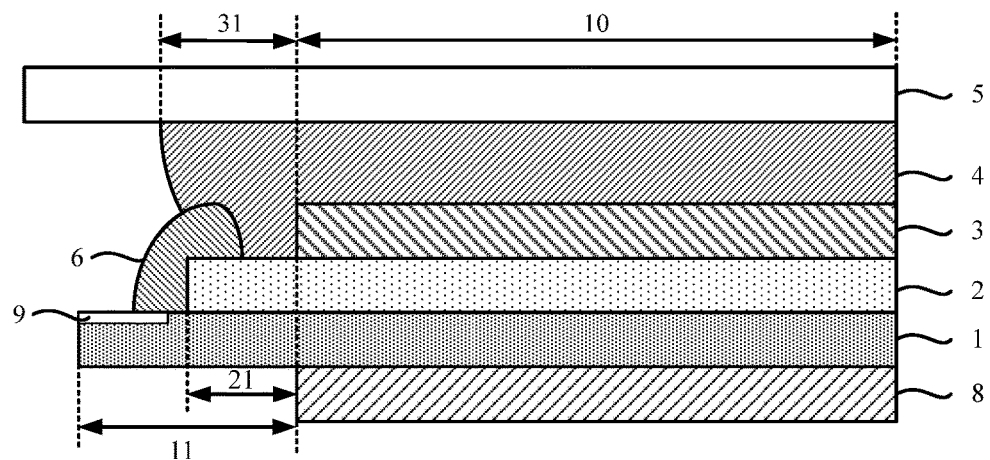
FIG. 8 is another schematic diagram of a structure of a display panel provided by an embodiment of the present disclosure.

As illustrated in FIG. 8, for example, the electrostatic release structure 6 is disposed outside an effective light emitting region 10 (that is an effective display region) of the array substrate 1. In this case, the occupation of the effective light emitting region may be reduced, so as to avoid reducing the opening rate of the display panel by the electrostatic release structure. The effective display region may be a region simultaneously provided with the lower polarizer, the array substrate, the opposing substrate and the upper polarizer.

For example, the array substrate is provided with a plurality of gate lines and a plurality of data lines, the gate lines and the data lines cross each other to form a plurality of pixel regions. The pixel regions are not overshadowed by a black matrix of the display panel, and a region between adjacent pixel regions is overshadowed by the black matrix. In this case, for example, the effective light emitting region of the array substrate comprises the pixel regions and the region between adjacent pixel regions, the outside of the effective light emitting region of the array substrate is a peripheral region, and the electrostatic release structure may be disposed in the peripheral region. It should be noted that, the pixel regions may be active light emitting regions, and may also be light transmitting regions for transmitting the light emitted by a backlight source (which is configured for providing backlight for the display panel).

For example, the array substrate 1 comprises a first extending section 11 disposed outside the effective light emitting region 10, the opposing substrate 2 comprises a second extending section 21 disposed outside the effective light emitting region 10, the adhesive layer 4 comprises a third extending section 31 disposed outside the effective light emitting region 10.

For example, in a direction perpendicular to the thickness direction (the horizontal direction as illustrated in FIG. 8) of the array substrate 1, the first extending section 11 is longer than the third extending section 31, and the first extending section 11 plays a role of carrying the electrostatic release structure 6. In this case, the opposing substrate may comprise the second extending section, or may not comprise the second extending section, as long as it is possible to realize the first extending section carrying the electrostatic release structure.

For example, in the direction perpendicular to the thickness direction of the array substrate 1, the third extending section 31 is longer than the second extending section 21, which is facilitate to connecting the third extending section 31 with the electrostatic release structure 6.

For example, the first extending section 11 is provided with a ground wiring 9, the ground wiring 9 is connected with the electrostatic release structure 6. The ground wiring 9 is configured to release the static electricity from the display panel.

For example, the electrostatic release structure 6 comprises a section disposed on the first extending section 11 and connected with the third extending section 31. For example, the electrostatic release structure 6 is disposed on the first extending section 11 and the second extending section 21 (that is the electrostatic release structure comprises a section disposed on the first extending section 11 and the second extending section 21), and the electrostatic release structure 6 is connected with the third extending section 31. For example, the electrostatic release structure 6 comprises a conductive silver paste portion. An embodiment of the electrostatic release structure 6 includes but is not limited to the conductive silver paste.

In at least one embodiment of the present disclosure, for example, the conductive silver paste may be arranged (for example, in a way of dispensing) on the first extending section (or the first extending section and the second extending section) to act as the electrostatic release structure, on one hand, the first extending section plays a role of carrying the conductive silver paste, on the other hand, the first extending section may provide a following electrostatic conductive circuit for the conductive silver paste, so that a charge in the adhesive layer may be transmitted to the ground wiring in the first extending section through the conductive silver paste, and further the charge is released from the display panel to achieve the releasing of the static electricity.

For example, in a case that a distance of the third extension section 31 is larger than a preset distance (such as form 0.01 mm to 0.1 mm), the conductive silver paste has a shape of a point, otherwise the conductive silver paste has a shape of a strip.

In a case that the distance of the third extension section is larger than the preset distance, the adhesive layer may provide a larger area to connect with the electrostatic release structure outside the effective display region, therefore, the conductive silver paste may be set with the shape of a point, so as to simplify the coating of the conductive silver paste.

In a case that the distance of the third extension section is less than or equal to the preset distance, the adhesive layer may provide a smaller area to connect with the electrostatic release structure outside the effective display region. The conductive silver paste may be set with the shape of a strip to ensure the area that the conductive adhesive layer contacted with the electrostatic release structure, and thus to ensure the electrostatic release effect.

Figure 9:
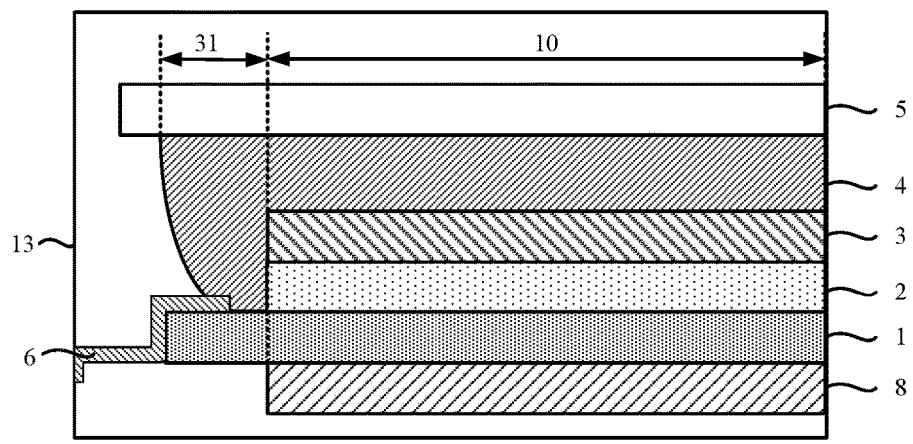
FIG. 9 is another schematic diagram of a structure of a display panel provided by an embodiment of the present disclosure.

For example, as illustrated in FIG. 9, the adhesive layer 4 comprises a third extending section 31 disposed outside the effective light emitting region 10, the electrostatic release structure 6 comprises a conductive foam and/or a conductive cloth, and the electrostatic release structure 6 is connected with a shell 13 of the display panel as well as the third extending section 31.

At least one embodiment of the present disclosure provides another setting mode of the electrostatic release structure. In a case that the display panel is applied to a structure with a shell, if there is a large space between the display panel and the shell, the electrostatic release structure may be disposed in the space, so that it is not necessary to extend at least one of the array substrate and the opposing substrate outside the effective display region (for example, as illustrated in FIG. 9, the opposing substrate dose not comprise the second extending section).

For example, the adhesive layer 4 comprises an adhesive material and the conductive material distributed within the adhesive material.

For example, the adhesive material comprises an optically clear adhesive (OCA) or an optical clear resin (OCR).

It is possible to ensure that the adhesive layer has a good contact with the electrostatic release structure by using one of the two materials as the adhesive material of the adhesive layer, so that the static electricity may be released easily. Taking the optical clear resin as an example, it has a good fluidity, and it is convenient to be bonded with the protection substrate, the upper polarizer and the electrostatic release structure, and to ensure that there is no bubble in the adhering position, so that a good connection between the adhesive layer and the electrostatic release structure is ensured.

For example, as illustrated in FIG. 5 to FIG. 9, the adhesive layer 4 comprises a section located between the electrostatic release structure 6 and the upper polarizer 3, the section is connected with the opposing substrate 2 to release static electricity from the opposing substrate 2 to the electrostatic release structure 6.

Figure 10A:
FIG. 10a and FIG. 10b are top view schematic diagrams of display panels provided by an embodiment of the present disclosure.
Figure 10B:
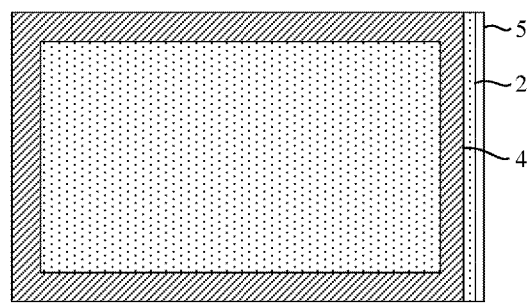

For example, as illustrated in FIG. 10a, the adhesive layer 4 may be formed by a structure in an entire surface, that is, the protection substrate 5 is connected to the opposing substrate 2 in a fully adhering manner; or as illustrated in FIG. 10b, the adhesive layer may also be a closed ring structure, that is, the protection substrate 5 is connected to the opposing substrate 2 in a frame attaching manner. In the case of using the fully adhering manner, because the area of the adhesive layer 4 is larger, it is more convenient to release the static electricity from the display panel to the electrostatic release structure.

Figure 11:
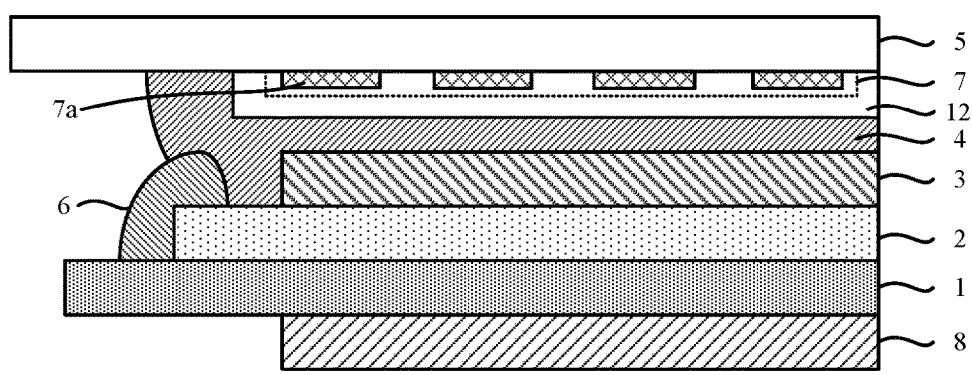
FIG. 11 is another schematic diagram of a structure of a display panel provided by an embodiment of the present disclosure.

For example, as illustrated in FIG. 11, in the case that the touch electrode layer 7 is disposed between the adhesive layer 4 and the protection substrate 5, an insulating layer 12 is also disposed between the touch electrode layer 7 and the adhesive layer 4, so as to avoid a short of a plurality of touch electrodes 7a which are separated from each other in the touch electrode layer 7 by the adhesive layer 4. It should be noted that, the touch electrode layer 7 illustrated in FIG. 6 and FIG. 7 further comprises a plurality of the touch electrodes 7a which are separated from each other, but not illustrated in FIG. 6 and FIG. 7.

Figure 12:
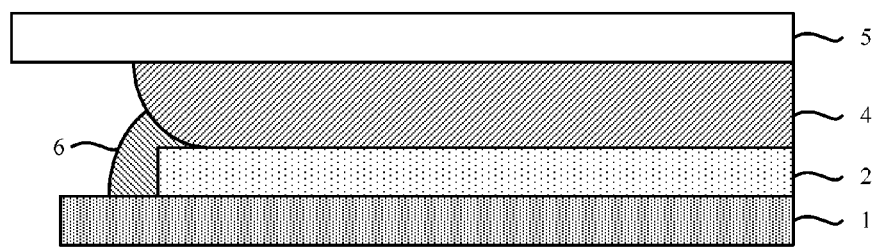
FIG. 12 is another schematic diagram of a structure of a display panel provided by an embodiment of the present disclosure.

For example, as illustrated in FIG. 12, as least one embodiment of the present disclosure further provides another display panel, and the display panel comprises: an array substrate 1; an opposing substrate 2 which is disposed above the array substrate 1; an adhesive layer 4 which is disposed above the opposing substrate 2 and in which a conductive material is distributed; a protection substrate 5 which is disposed above the adhesive layer 4 and fixed with the opposing substrate 2 by the adhesive layer 4; and an electrostatic release structure 6 contacting with the adhesive layer 4 and configured to release static electricity of the adhesive layer 4.

The setting mode of the array substrate, the opposing substrate, the adhesive layer, and the electrostatic release structure in the display panel provided by the embodiment of the present disclosure can refer to the descriptions of the display panel provided in any of the above embodiments, and detailed descriptions will be omitted here.

It should be noted that, FIGS. 5 to 12 only illustrate a partial structure of the display panel. For example, the display panel further comprises a liquid crystal layer disposed between the array substrate 1 and the opposing substrate 2 or a plurality of light emitting units (such as OLED, organic light emitting diode) and so on.

For example, the display panel provided in any one of the embodiments of the present disclosure may be a display panel such as a liquid crystal panel etc. that needs a backlight provided by a backlight source, and also may be an active display panel such as an OLED display panel.

Embodiments of the present disclosure further provide a display device, and the display device comprises the display panel according to any one of the above embodiments.

It should be noted that, the display device in the embodiments of the present disclosure may be: an electronic paper, a mobile phone, a tablet computer, a television, a notebook computer, a digital photo frame and a navigator etc. any product or component with a display function.

The technical solution of the embodiments of the present disclosure has been described in detail with reference to the drawings. In the technical solution of the embodiments of the present disclosure, the conductive material distributed in the adhesive layer which is configured to adhesive the protection substrate and the upper polarizer makes the adhesive layer has a certain conductive function, thus, the static electricity generated in the display panel is transmitted to the electrostatic release structure by the adhesive layer, and the static electricity is released from the display panel by the electrostatic release structure. The adhesive layer in the embodiments of the present disclosure can be realized only by adjusting the conductive property of the adhesive layer in the display panel illustrated in FIG. 1 to FIG. 4, and it is not necessary to add an extra layer in the display panel, therefore, the structure is simple and easy to be realized.

It should be noted that, similar reference numerals indicate similar elements in the entire disclosure.

In the embodiments of the present disclosure, the term "a plurality of" means two or more, unless otherwise expressly limited.

What are described above is related to the illustrative embodiments of the disclosure only and not limitative to the scope of the disclosure; the scopes of the disclosure are defined by the accompanying claims.

The application claims priority to the Chinese patent application No. 201610007257.9, filed Jan. 6, 2016, the entire disclosure of which is incorporated herein by reference as part of the present application.

What is claimed is:

1. A display panel, comprising:
an array substrate;
an opposing substrate, disposed above the array substrate;
an upper polarizer, disposed above the opposing substrate;
an adhesive layer, disposed above the upper polarizer and in which a conductive material is distributed;
a protection substrate, disposed above the adhesive layer and fixed with the upper polarizer by the adhesive layer;
an electrostatic release structure, contacting with the adhesive layer and configured to release static electricity of the adhesive layer; and
a touch electrode layer;
wherein the touch electrode layer is disposed on one side of the adhesive layer away from the protection substrate, and a resistance of the adhesive layer is greater than or equal to $10^7$ $\Omega$ and is less than or equal to $10^{12}$ $\Omega$; or wherein the touch electrode layer is disposed between the opposing substrate and the protection substrate, and a resistance of the adhesive layer is less than or equal to $10^4 \Omega$.

2. The display panel according to claim 1, wherein in a case where the touch electrode layer is disposed on one side of the adhesive layer away from the protection substrate, the touch electrode layer is further disposed between the array substrate and the opposing substrate.

3. The display panel according to claim 1, wherein in a case where the touch electrode layer is disposed between the opposing substrate and the protection substrate, the touch electrode layer is further disposed on one side of the adhesive layer facing the protection substrate.

4. The display panel according to claim 1, wherein the electrostatic release structure is disposed outside an effective light emitting region of the array substrate.

5. The display panel according to claim 4, wherein the array substrate comprises a first extending section disposed outside the effective light emitting region, the opposing substrate comprises a second extending section disposed outside the effective light emitting region, the adhesive layer comprises a third extending section disposed outside the effective light emitting region, the first extending section is longer than the third extending section, and the third extending section is longer than the second extending section.

6. The display panel according to claim 5, wherein the electrostatic release structure comprises conductive silver paste, and the conductive silver paste is disposed on the first extending section and the second extending section and connected with the third extending section.

7. The display panel according to claim 6, wherein in a case that a distance of the third extension section is larger than a preset distance, the conductive silver paste has a shape of a point, otherwise the conductive silver paste has a shape of a strip.

8. The display panel according to claim 7, wherein the preset distance ranges from 0.01 mm to 0.1 mm.

9. The display panel according to claim 4, wherein the array substrate comprises a first extending section disposed outside the effective light emitting region, the adhesive layer comprises a third extending section disposed outside the effective light emitting region, and the first extending section is longer than the third extending section.

10. The display panel according to claim 9, wherein the electrostatic release structure is disposed on the first extending section and connected with the third extending section.

11. The display panel according to claim 5, wherein the first extending section is provided with a ground wiring.

12. The display panel according to claim 4, wherein the adhesive layer comprises a third extending section disposed outside the effective light emitting region, the electrostatic release structure comprises conductive foam and/or conductive cloth, which is connected with a shell of the display panel as well as the third extending section.

13. The display panel according to claim 1, wherein the adhesive layer comprises an adhesive material and the conductive material that is distributed within the adhesive material.

14. The display panel according to claim 13, wherein the adhesive material comprises an optically clear adhesive (OCA) or an optical clear resin.

15. A display panel, comprising:
an array substrate;
an opposing substrate, disposed above the array substrate;
an adhesive layer, disposed above the opposing substrate and in which a conductive material is distributed;
a protection substrate, disposed above the adhesive layer and fixed with the opposing substrate by the adhesive layer; and
an electrostatic release structure, contacting with the adhesive layer and configured to release static electricity of the adhesive layer
wherein the adhesive layer comprises a third extending section disposed outside the effective light emitting region; the electrostatic release structure comprises conductive silver paste; and in a case that a distance of the third extension section is larger than a preset distance, the conductive silver paste has a shape of a point, otherwise the conductive silver paste has a shape of a strip.

* * * * *